United States Patent [19]
Eberle

[11] 3,753,108
[45] Aug. 14, 1973

[54] MEANS AND METHOD FOR NUMERICALLY DISPLAYING THE TIMING OF IGNITION OR OTHER REPETITIVE EVENTS

[75] Inventor: Arthur C. Eberle, Upper Arlington, Ohio

[73] Assignee: Columbia Gas System Service Corporation, Wilmington, Del.

[22] Filed: Apr. 9, 1971

[21] Appl. No.: 132,750

[52] U.S. Cl. .............................. 324/16 R, 73/118
[51] Int. Cl. .......................................... F02p 17/00
[58] Field of Search .............. 324/15, 16 R, 16 T, 324/16 S; 73/116, 117.3, 118 R, 119 A; 331/1 A; 33/1 N, 1 PT

[56] References Cited
UNITED STATES PATENTS
3,474,667  10/1969  Fuchs .............................. 324/16 T
3,454,871  7/1969  Nolting ............................ 324/16 T FOREIGN PATENTS OR APPLICATIONS
249,849  12/1969  U.S.S.R. ........................... 73/119 A Primary Examiner—Michel J. Lynch
Attorney—Curtis, Morris & Safford

[57] ABSTRACT

A digital ignition analyzer which calibrates the output frequency of a pulse generator with respect to the rotational speed of an engine, and then uses a counter to count the pulses from the generator during the time between ignition in a selected cylinder and a reference time. The count displayed on the counter gives a direct digital reading of the rotational angle between the reference point and the point of ignition.

12 Claims, 1 Drawing Figure

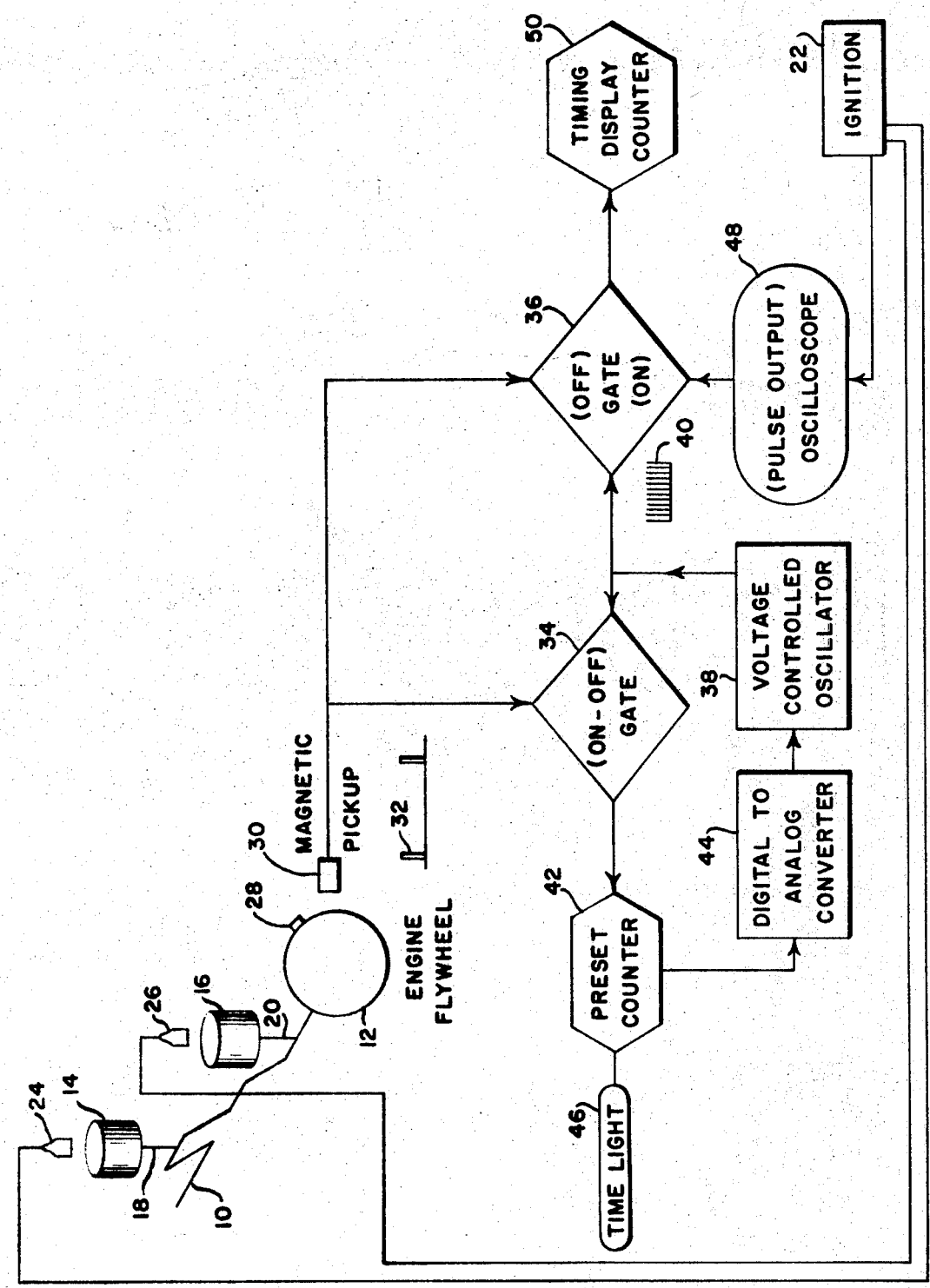

MEANS AND METHOD FOR NUMERICALLY DISPLAYING THE TIMING OF IGNITION OR OTHER REPETITIVE EVENTS

This invention relates to engine analyzers, and more particularly to an analyzer system for measuring and indicating the ignition timing of an internal combustion engine.

The introduction of solid-state ignition systems, such as those using transistors or thyristors, for internal combustion engines, and particularly for large industrial engines, has created a need for an improved ignition analyzer to determine the timing of the ignition with respect to the angular position of the crankshaft.

One object of the present invention is to provide an accurate timing system for engines. Another object is to provide ignition timing means for internal combustion engines. A further object is to provide for the above with apparatus which is efficient and dependable, and which gives timing indications which may be read easily and continuously.

The present invention includes a transducer, which may be a magnetic device, to be actuated by a magnetic inhomogeneity on the shaft of the engine being tested or on a flywheel attached to the shaft. The magnetic inhomogeneity may be a bolt or a hole and the relative positions of the transducer and the magnetic inhomogeneity may be set to make the pulses occur when the shaft is at any desired index position, such as when the number one piston is at top dead center. The invention further includes a gate circuit, which is connected to the transducer to be turned on and off, alternately, by successive pulses from the transducer and is connected between an oscillator and a preset counter to permit oscillations to reach the counter when the gate circuit is on. The counter is preset to a multiple of 360, preferably 3,600, and each oscillation reduces the count by one. The output of the counter is connected to a control circuit which in turn is connected to the oscillator to set the frequency so that the oscillator will produce oscillations at a rate that will result in reducing the count to zero during the time between two successive pulses from the transducer. This time is exactly equal to the time required for the shaft to make one revolution.

The timing system of this invention also includes another transducer, for example a Hall-effect generator, another gate circuit, and a counter that counts up from zero. The Hall-effect generator may be attached to an ignition wire that produces a signal pulse in response to each ignition current pulse through the wire. The signal pulse, in addition to being displayed on an oscilloscope, turns the second gate circuit on to allow oscillations from the oscillator to be transmitted through the second gate circuit to the second counter. The second gate circuit is also connected to the first-mentioned transducer to be turned off by pulses therefrom and thereby stop the second counter at that instant. The number of counts, presented numerically, is equal to the number of degrees, to the nearest one-tenth of a degree, of rotation of the shaft from the position it occupied at the time of the ignition pulse to the index position.

The single FIGURE of the drawing is a block diagram of an engine analyzer constituting one embodiment of the present invention. To clarify the operation of the analyzer, several of the basic components of an engine are also shown. These components include a crankshaft 10 having a flywheel 12 at one end and two pistons 14 and 16 connected to the crankshaft by a pair of connecting rods 18 and 20. An ignition system 22 provides high voltage pulses for a pair of spark plugs 24 and 26. The engine itself, including the ignition system 22, is not part of the invention and therefore is not described in detail. It is shown only to illustrate the operation of the analyzer. In actual practice the engine with which the analyzer is used may have any number of cylinders and may have an ignition system of much greater complexity than that shown in the drawing.

The flywheel 12 has a bolt 28 on it, and a magnetic transducer 30 is located adjacent the flywheel so that the movement of the bolt past the transducer will disturb the magnetic field of the latter and generate a voltage pulse 32. The transducer 30 may be located at any point around the perimeter of the flywheel 12, but it is particularly convenient to locate it so that the pulse 32 is generated when the piston 14, which may be referred to as the number one piston, reaches its top dead center (TDC) location. This may also be referred to as the index position of shaft 10.

Since pulses are generated in the transducer 30 by reason of the disturbance of the magnetic field, some other form of magnetic inhomogeneity may be used instead of a bolt. For example, the flywheel 12 may have a hole located in it in place of the bolt 28. All that is necessary is that the magnetic field of the transducer 30 be suddenly changed by movement of a magnetic inhomogeneity to produce a pulse 32 once each revolution of the flywheel.

The pulse output of magnetic transducer 30 is connected to the control terminals of two flip-flop gate circuits 34 and 36. Each successive pulse 32 from transducer 30 reverses the operational state of gate 34, turning it either "on" or "off" from its previous state. A voltage controlled timing oscillator 38 is connected to both of the gates 34 and 36 to apply pulses 40 to them continuously. The gate 34 is connected to a preset counter 42, and during the "on", or conductive, state of gate 34, pulses 40 are transmitted to the counter 42. The counter 42 is preset to a specific count value which, for timing purposes, is a multiple of 360. Preferably, the preset value is 3,600, and the transmission of each pulse 40 through gate 34 to counter 42 reduces the count by one. One output circuit of counter 42 is connected to a digital-to-analog (D/A) converter 44, the output of which is connected to a control input terminal of the voltage controlled oscillator 38.

Gate 34 is placed in its conductive state by one of the pulses 32 and remains in that state until the next pulse 32 changes it to its "off", or non-conductive, state. It remains non-conductive until the third pulse 32 makes it conductive again. As a result, the pulses 40 are transmitted to counter 42 in groups. At the end of each group, the count remaining in counter 42 may have a zero value or a positive value or a negative value, depending upon whether the number of pulses in that group was equal to the preset value or was less or greater than the preset value, respectively. Any of these three conditions of counter 42 is transformed by D/A converter 44 into an analog voltage to be applied to control the frequency, or repetition rate, of pulses 40 produced by oscillator 38. This analog voltage is of the proper amplitude and polarity to adjust the oscillator to produce pulses 40 at a repetition rate that will, between two successive pulses 32, exactly match the value preset on counter 42. If the analog voltage applied to oscillator 38 cannot change the repetition rate of pulses 40 sufficiently in the first group of pulses, it may be necessary to count another group of pulses 40 the next time gate 34 is placed in its conductive state.

In order to determine when the repetition rate of pulses 40 matches the preset value on counter 42, an indicator light 46 is connected to another output terminal of counter 42. This light turns on and remains on as long as the repetition rate of pulses 40 is correct to within the required degree of accuracy, for example ± 0.1 percent error/pulse. Establishing the correct repetition rate of the pulses 40, which may take only two revolutions of flywheel 12, is the necessary first step in utilizing the ignition analyzer. Thereafter, the timing of ignition pulses from the ignition system 22 may be carried out.

Pulses from ignition system 22 may be obtained by placing a suitable transducer, such as a Hall-effect generator, close to the wire connected to one of the spark plugs, for example plug 26. Pulses from the Hall-effect generator are then connected to an oscilloscope 48 on which their waveform may be displayed. The oscilloscope also has an output terminal from which signal pulses may be derived corresponding to the ignition pulses. These pulses are applied to an input terminal of gate 36 to turn that gate on. Magnetic transducer 30 is connected to a terminal of gate 36 that turns the gate off. Contrary to gate 34, which is on for a full revolution at a time, gate 36 may be on for only a small part of a revolution, for example the time between the ignition of spark plug 24 and the time piston 14 reaches top dead center. Gate 36 is able to transmit pulses 40 to a timing display counter 50 only during this conductive interval. The pulses applied to timing display counter 50 energize suitable indicating means, such as a multiple digit numeric indicator. The number displayed is equal to the number of degrees, to the nearest one-tenth, of rotation of crankshaft 10 and flywheel 12 from the time of occurrence of the ignition pulse being analyzed to the time shaft 10 reaches the index position. This number may be changed by adjusting the timing of the ignition system 22, either in accordance with a prescribed normal setting or in accordance with an experimental setting. Changing the timing is likely to change the speed of the engine and require that the frequency of oscillator 38 be recalibrated because it will take a different length of time to generate 3,600 pulses at the new engine speed.

This system is not limited to timing the ignition pulses of an engine. Any repetitive event that occurs at a fixed position of the shaft 10 and can be transformed by a suitable transducer into an electrical impulse signal can be measured. Such events as vibration, cylinder pressure, etc. can be analyzed in this way, and the shaft positions at which these events occur or reach specific values can be displayed on the timing display counter relative to an index position. It should also be understood that any other index position may be selected by simply varying the relative positions of the bolt 28 and the magnetic transducer 30. The procedure for measuring relative timing can be carried out with respect to any selected position of the shaft 10, and not just with respect to the position that corresponds to top dead center of the piston 14.

The apparatus can also be used to measure the rotational speed of the shaft 10. To do so the preset counter 42 should be set at a multiple of sixty, such as 6,000. Then pulses 32 from the transducer 30 are allowed to actuate the gate 34, and the voltage controlled oscillator 38 is adjusted until the timing light 46 goes on, indicating that the preset counter 42 has counted 6,000 of the pulses 40 during one interval that the gate 34 was conductive, that is, during one revolution of the shaft 10. The frequency indicated on the dial of the oscillator is then 100 times the engine speed in revolutions per minute. If a counter 42 is used with an internal time base, the oscillator frequency may be determined from the counter.

What is claimed is:

1. Apparatus for providing numerical display of timing information of the occurrence of an engine event relative to a predetermined angular orientation repeatedly passed in the rotation of a shaft, said apparatus comprising:
   means for sensing one full revolution of said shaft;
   means for generating electrical signals at a repetition rate equal to a fixed integral number of cycles per revolution of said shaft;
   means for controlling the generation of said signals to maintain said integral number at a fixed, known value, said controlling means comprising counting means to count the number of cycles of said signals per revolution, and comparison means to compare the number counted with said integral number and to generate a control signal if said number counted differs from said integral number, said comparison means being connected to said generating means whereby said control signal effects the repetition rate of said signals to maintain said number counted equal to said integral number;
   means for counting the cycles of said signal for a predetermined interval bounded in time by an occurrence of said event and a passage of said shaft through said predetermined orientation; and
   means for displaying the count.

2. The apparatus according to claim 1 comprising means for indicating synchronization of the generated signal frequency with shaft rotation.

3. The apparatus according to claim 2 in which said indicating means is a light.

4. The apparatus, according to claim 2 in which said means for indicating synchronization comprises interrupting means connected to said means for displaying said count to permit said count to be displayed only when said signal frequency is synchronized with the shaft rotation.

5. The apparatus according to claim 1 in which said generating means comprises a voltage-controlled oscillator for providing said signals, said counter comprises a preset counter for counting the output cycles from said oscillator, and said comparison means comprises a switching device activated and deactivated by said sensing means and connected between said oscillator output and said preset counter, and a digital-to-analog converter connected to said preset counter to change the digital output remainder from the preset counter into an analog voltage after deactivation of said switching device, said converter being connected to said oscillator to supply said analog voltage thereto to adjust the frequency of said oscillator.

6. An apparatus according to claim 5 in which said switching device is a flip-flop gate circuit.

7. Apparatus for timing and displaying a numerical indication of the phase angle between a pre-determined shaft position of an engine and the position of said shaft at the occurrence of a repetitive engine event, said apparatus comprising first transducer means for generating a first electrical impulse signal once each revolution of said shaft when said shaft is at said pre-determined shaft position; an oscillator for generating a second impulse signal having a frequency that is a known integral multiple of the frequency of said first signal, whereby said shaft rotates a pre-determined angle per cycle of said second impulse; means for controlling said oscillator to hold said second impulse frequency at said integral multiple, said controlling means comprising a presettable counter to compare the number of impulses of said second signal per revolution of said shaft relative to a preset integral number, and means connected to said counter to generate a control signal connected to said oscillator to maintain the frequency thereof at a value such that said number of impulses counted is equal to said preset number; second transducer means for generating a third electrical signal at the occurrence of said repetitive event; a display counter; and gating means connecting said oscillator and said display counter and being connected to said second transducer means to become conductive upon the occurrence of each said third signal to conduct said second electric impulse signal from said oscillator to said display counter during each conductive interval of said gating means, said gating means being connected to said first transducer to become non-conductive upon the occurrence of each said first impulse signal whereby said display counter indicates, in response to the number of pulses of said second impulse signal counted during each conductive interval of said gating means, a numerical measure of the angle through which said shaft rotates between said repetitive event and said pre-determined shaft position.

8. The apparatus of claim 7 in which said means for controlling said oscillator comprises a gated control circuit connected to said oscillator to control the frequency thereof and connected to said first transducer means to be turned on and off alternately by successive ones of said first electrical impulse signal.

9. The apparatus of claim 8 in which said oscillator is a voltage-controlled oscillator.

10. The apparatus of claim 9 in which said gated control circuit comprises a second gating circuit and said preset counter set at said integral multiple of the frequency of said first signal is connected to said gated control circuit to receive said second impulse signals during complete alternate rotations of said shaft, and said means to generate a control signal comprises a digital-to-analog converter connected to said preset counter to generate an analog voltage corresponding to the count remaining on said preset counter after said second gating circuit has been turned off, said converter being connected to said oscillator to apply said analog voltage thereto to control the frequency of said oscillator.

12. The method of timing and displaying the phase angle between a predetermined shaft position and a repetitive interval combustion engine event comprising the steps of: sensing complete rotations of the engine shaft; generating a signal having a frequency that is an integral multiple of the number of rotations of said shaft per unit of time; counting the number of cycles of said signal occurring between the repetitive engine event and the sensed completed shaft rotation; displaying the count of the frequency cycles; counting the number of cycles of said signal occurring per rotation of said shaft; comparing the number of cycles counted per rotation with a predetermined number; and controlling the frequency of said oscillator to maintain the number of said cycles occurring per rotation fixed at said predetermined number.

11. The apparatus according to claim 10, in which the frequency of said oscillator is a multiple of 360 times the frequency of said first signal.

* * * * *